(12) United States Patent
Taniguchi et al.

(10) Patent No.: US 6,565,642 B2
(45) Date of Patent: May 20, 2003

(54) PIGMENT DISPERSION LIQUID AND METHOD OF PRODUCING THE SAME

(75) Inventors: Keishi Taniguchi, Ohta-ku (JP); Shigeo Hatada, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/942,660

(22) Filed: Aug. 31, 2001

(65) Prior Publication Data

US 2002/0029725 A1 Mar. 14, 2002

(30) Foreign Application Priority Data

Sep. 1, 2000 (JP) .................................. 2000-265832

(51) Int. Cl.$^7$ ................................. C09C 1/62
(52) U.S. Cl. .................. 106/403; 106/410; 106/415; 106/417; 106/472; 106/495; 106/498
(58) Field of Search ................. 106/403, 410, 106/415, 417, 472, 495, 498

(56) References Cited

U.S. PATENT DOCUMENTS 4,543,375 A   9/1985   Doebler et al.

FOREIGN PATENT DOCUMENTS

| EP | 0 933 405 | 8/1999 | | |
|---|---|---|---|---|
| JP | 57-10660 | 1/1982 | | |
| JP | 57-10661 | 1/1982 | | |
| JP | 63-51485 | 3/1988 | | |
| JP | 63-56575 | 3/1988 | | |
| JP | 1-15542 | 3/1989 | | |
| JP | 1-198671 | 8/1989 | | |
| JP | 2-255875 | 10/1990 | | |
| JP | 2-276876 | 11/1990 | | |
| JP | 2000-351916 | * 12/2000 | ............. | C09C/3/10 |

OTHER PUBLICATIONS

Derwent Abstract, AN 2001–331164, JP 2000–351916, Dec. 19, 2000.
Derwent Abstract, AN 1995–218197, JP 7–128883, May 19, 1995.
Derwent Abstract, AN 1976–46842X, JP 51–050952, May 6, 1976.

* cited by examiner

*Primary Examiner*—C. Melissa Koslow
*Assistant Examiner*—Shalie Manlove
(74) *Attorney, Agent, or Firm*—Oblon, Spivak, McClelland, Maier & Neustadt, P.C.

(57) ABSTRACT

The pigment dispersion liquid is produced using at least a pigment, liquid medium, and a dispersant, as follows. That is, a mixture consisting of at least the pigment, liquid medium and the dispersant is held under a pressure which is less than the atmospheric pressure and then the mixture is held under a pressure equal to or higher than the atmospheric pressure. Finally, dispersion is carried out.

30 Claims, No Drawings

PIGMENT DISPERSION LIQUID AND METHOD OF PRODUCING THE SAME

FIELD OF THE INVENTION

The present invention relates to a pigment dispersion liquid and a method of producing the pigment dispersion liquid obtained. More particularly, this invention relates to the method of producing a pigment dispersion liquid, which can efficiently produce a pigment dispersion liquid suitable for ink-jet-recording inks with a micro average particle size of 200 nm or smaller.

BACKGROUND OF THE INVENTION

Inks used for conventional ink-jet-recording systems have mainly been various water-soluble dyes dissolved in water only or in a solvent consisting of water and water-soluble solvents, with various additives if necessary, as disclosed in Japanese Laid Open Patent Publication No. 63-51485, 63-56575, and 01-198671, etc.

However, when printing is done using these dye inks, there is a problem that the dye in the recorded region gets blotted easily if water is spilt on the region, because the recorded image (i.e. the dye ink) on the material on which the image is to be recorded, has low water resistance. Further, there is a problem that change in color tone and decrease in density occur if the recorded region is exposed to light, because lightfastness of the recorded image (i.e. the dye ink) on the material is low.

To solve the above problems of the dye ink, application of so-called pigment inks on ink-jet-recording systems using carbon black or various organic pigments as colorants, instead of using dyes as colorants, has been disclosed in Japanese Laid Open Patent Publication No. 57-10660, 57-10661, 02-255875, 02-276876 and Japanese Examined Patent Publication No. 01-15542.

When printing is done using the pigment ink, since the colorant of the dried ink on the material is a pigment, in contrast to the dye ink, the pigment ink is not dissolved and does not get blotted even when water is spilt on it, having a good water resistance. Moreover, because pigments are less reactive to light in contrast to dyes, pigment inks are more lightfast than dye inks.

The pigment ink is generally prepared as a pigment dispersion liquid by dispersing a mixture of a pigment, a liquid medium, and a dispersant using a dispersing apparatus such as a ball-mill and a sand-mill, and adding various additives if necessary to the prepared pigment dispersion liquid.

Conventionally, in the production of the pigment dispersion liquid, a pigment powder (which normally consists of secondary particles that are aggregates of pigment primary particles), a liquid medium (such as water or organic solvents), and a dispersant are mixed, and the mixture is dispersed with a dispersing apparatus. However, there have been no particular attempts to increase the dispersion efficiency of the mixture.

The pigment particles in the pigment dispersion liquid for ink-jet-recording inks have to be miniaturized to a particle size of 200 nm or less normally and more preferably to a size of 150 nm or less to avoid clogging at the nozzle unfailingly and ensure transparency of the recorded image. To achieve this miniaturized, the pigment powder has had to be miniaturized without limit to a size of the pigment primary particles.

On the other hand, it has been know that the dispersion process of pigment powder consists of steps which are:
(1) "wetting" of the pigment powder, that is, a step wherein air on surface of the pigment secondary particles and in voids inside the secondary particles is substituted by the liquid medium and/or the liquid medium plus the dispersant;
(2) a step wherein the pigment secondary particles are ground (or miniaturized) by a dispersing apparatus; and
(3) a step wherein the dispersant is adsorbed on the miniaturized pigment particle surface as a "prevention of re-aggregation" of the micro pigment particles.

By performing the "wetting" step before performing the dispersion process of the mixture consisting of the pigment powder, the liquid material, and the dispersant, the following dispersion process proceeds efficiently shortening the time required to prepare the pigment dispersion liquid with the micro particle size. However, in the "wetting" step in the conventional art, the mixture is only simply stirred for a long period of time (as a step known as premix), and although the "wetting" of the pigment secondary particle surface is achieved, in reality the "wetting" of the primary particle surface inside the secondary particles cannot be achieved just by simply increasing the stirring time, thus not being able to shorten the time of dispersion.

SUMMARY OF THE INVENTION

It is an object of the present invention to provide a method of producing a pigment dispersion liquid, which enables efficient preparation of a pigment dispersion liquid. Another object of the present invention is to provide a pigment dispersion liquid obtained by the method. In particular, it is an object of the present invention to provide the method of producing the pigment dispersion liquid, which can efficiently produce, in a short period of time, a pigment dispersion liquid having a micro particle size suitable for ink-jet-recording inks.

According to one aspect of the present invention, the pigment dispersion liquid is produced using at least a pigment, liquid medium, and a dispersant, as follows. That is, a mixture consisting of at least the pigment, liquid medium and the dispersant is held under a pressure which is less than the atmospheric pressure and then the mixture is held under a pressure equal to or higher than the atmospheric pressure. Finally, a dispersion process is performed.

According to another aspect of the present invention, the pigment dispersion liquid is produced using at least a pigment, liquid medium, and a dispersant, as follows. That is, a mixture consisting of at least the pigment and the liquid medium is held under a pressure which is less than the atmospheric pressure and then the mixture is held under a pressure equal to or higher than the atmospheric pressure. A dispersant is added to this mixture while and/or after the mixture is held under the pressure equal to or higher than the atmospheric pressure. Finally, a dispersion process is performed.

Other objects and features of this invention will become apparent from the following description with reference to the accompanying drawings.

DESCRIPTION OF THE PREFERRED EMBODIMENTS

Embodiments of this invention will be explained in more detail below.

The pigments used in the pigment dispersion liquid and the method of producing the dispersion liquid are not particularly specified but can be exemplified as shown below.

The examples of pigments which can be used for black color are carbon blacks like furnace black, lamp black, acetylene black, and channel black; metallic compounds such as copper, iron, and titanium oxide; and organic pigments like ortho-nitroaniline black.

The examples of pigments which can be used for other colors are Pigment Yellow 138, Pigment Red 122, Pigment Blue 15:3, toluidine red, Permanent Carmine FB, Fast Yellow AAA, Disazo Orange PMP, Lake Red C, Brilliant Carmine 6B, phthalocyanine blue, quinacridone red, dioxane violet, victoria pure blue, alkali blue toner, Furnace Yellow 10G, Disazo Yellow AAMX, Disazo Yellow AAOT, Disazo Yellow AAOA, yellow iron oxide, Disazo Yellow HR, ortho-nitroaniline orange, dinitroaniline orange, vulcan orange, toluidine red, chlorinated para red, brilliant fast scarlet, Naphthol Red 23, pyrazon red, Barium Red 2B, Calcium Red 2B, Strontium Red 2B, Manganese Red 2B, barium lithol red, Pigment Scarlet 3B Lake, Lake Bordeaux 10B, anthosin lake, Anthosin 5B Lake, Rhodamine 6G Lake, eosin lake, ferric oxide, Naphtol Red FGR, Rhodamin B Lake, methyl violet lake, dioxazine violet, Basic Blue 5B Lake, Basic Blue 6G Lake, fast sky blue, Alkali Blue R Toner, peacock blue lake, iron blue, ultramarine blue, Reflex Blue 2G, Reflex Blue R, brilliant green lake, diamond green thioflavine lake, Phtalocyanine Green G, green gold, Phtalocyanine Green Y, iron oxide powder, rust powder, zinc white, titanium oxide, calcium carbonate, clay, barium sulfate, alumina, alumina white, aluminium powder, bronze powder, daylight fluorescent pigment, pearl pigment, Naphthol Carmine FB, Naphthol Red M, Permanent Carmine FB, Fast Yellow G, Disazo Yellow AAA, dioxane violet, Alkali Blue G Toner, and processed pigments like graft carbon of which its pigment surface is processed with resin. Two or more of these may be mixed for the use as the case may be.

Out of these examples, in terms of dispersion stability, color tone reproducibility, and lightfastness, carbon black for black, Pigment Yellow 138 for yellow, Pigment Red 122 for magenta, and Pigment Blue 15:3 for cyan, can be preferably used respectively. The pigment concentration in the pigment dispersion liquid is preferably 5–30 weight % for improvement in dispersion efficiency.

As the dispersant, anionic surfactants, cationic surfactants, amphoteric surfactants, nonionic surfactants, high-molecular surfactants, high-molecular polymers and the like may be used.

As the anionic surfactants, alkylsulfate, polyoxyethylene alkyl ether sulfate, and the like can be used. As the cationic surfactants, alkyltrimethylammonium chloride, dialkyldimethylammonium choloride and the like can be used. As the amphoteric surfactants, alkyldimethyl aminoacetic acid betaine, alkyldimethyl amine oxide, alkylcarboxymethylhydroxyethyl imidazolium betaine and the like can be used.

As the nonionic surfactants, polyoxyethylene sorbitan fatty acid ester, polyoxyethylene alkyl ether, polyoxyethylene alkylphenyl ether, polyoxyethylene, polyoxypropylene glycol, polyoxypropylene alkyl ether and the like can be used.

As the high-molecular surfactants, high-molecular polyurethane, polyester and the like can be used. As the high-molecular polymers, polymers having functional groups which have affinity toward pigments e.g. carbonyl group or/and amino group, can be used.

Further, water-soluble resins may also be used as the dispersant. For example, cellulosic resin, acrylic resin, silicone resin, vinyl resin and the like can be used. These water-soluble resins may be added as a fixing agent for fixing the pigment on the material on which the pigment is recorded.

Out of the above dispersants, the surfactants may be preferably used in terms of micronization performance and dispersion stability.

In the present invention, water or organic solvents may be used, but in terms of cost and environmental safety, a water-soluble medium is preferred. The water-soluble medium can be water itself or a mixed solvent of water and water-soluble organic solvent. Ion-exchanged water (deionized water) is preferably used rather than normal water containing various ions.

Examples of the water-soluble organic solvent, which can be mixed with water, are shown below. These are: alkyl alcohols having carbon numbers of 1 to 4, such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones and ketone alcohols, such as acetone and diacetone alcohol; ethers such as tetrahydrofuran and dioxane; polyalkylene glycols such as polyethylene glycol and polypropylene glycol; alkylene glycols having alkylene groups with two to six carbon atoms, such as ethylene glycol, propylene glycol, butylene glycol, triethylene glycol, 1,2,6-hexanetriol, thiodiglycol, hexylene glycol, and diethylene glycol; lower alkyl ethers of polyhydric alcohols, such as glycerin, ethylene glycol monomethyl (or monoethyl) ether, diethylene glycol monomethyl (or monoethyl) ether, triethylene glycol monomethyl (or monoethyl) ether; N-methyl-2-pyrrolidone, 2-pyrrolidone, and 1,3-dimethyl-2-imidazolidinone.

Out of these many water-soluble organic solvents, polyhydric alcohols like diethylene glycol and lower alkyl ethers of polyhydric alcohols, such as triethylene glycol monomethyl (or monoethyl) ether are preferably used.

According to the present invention, an apparatus (reduced pressure retainer) for keeping the mixture of the pigment and liquid medium, or the mixture of the pigment, liquid medium, and dispersant, under reduced pressure, does not have to be of any special structure. A normal vacuum pan or a vacuum emulsification apparatus and when scale of production is small, a vacuum desiccator or a glass flask used for vacuum distillation, may be used as the reduced-pressure retainer. When the vacuum pan or vacuum desiccator is used, the mixture is first put in an open-air container, the container is then placed in the respective reduced-pressure retainer, and pressure inside the retainer can be reduced by an external vacuum pump.

When the glass flask used for vacuum distillation is used as the reduced-pressure retainer, the mixture is directly put in the glass flask, and pressure can be reduced by a vacuum pump. In order to avoid bumping of the mixture under reduced pressure and to smoothly draw out the air inside the pigment secondary particles, the mixture held under reduced pressure is preferably stirred.

When the mixture is stirred in the vacuum pan or the vacuum desiccator, the container containing the mixture and an appropriate stirring apparatus may be placed together inside the vacuum pan or the vacuum desiccator and the mixture can be kept under pressure which is less than the atmospheric pressure while being stirred. If the glass flask for vacuum distillation or a small-scale vacuum desiccator is used, a magnetic stirring bar may be put in the mixture beforehand so that stirring can be done by manipulation from outside using a magnetic stirrer and the like. If the vacuum emulsification apparatus is used, since a liquid stirring mechanism is equipped in the apparatus already, the mixture can be stirred using the mechanism directly. The vacuum pan or the vacuum desiccator preferably has a glass window that is resistant to pressure which is less than the atmospheric pressure, for checking the state of bubble formation in the mixture.

By holding the mixture, which has been held under pressure which is less than the atmospheric pressure, under a pressure equal to or higher than the atmospheric pressure, air is drawn out, and the liquid medium or the liquid medium plus the dispersant is pushed into the vacuum voids in place of air inside the pigment secondary particles, "wetting" the surface of the pigment primary particles almost completely. The mixture may simply be held under atmospheric pressure, but it is even more preferable to put the mixture in a pressurizer such as a pressure pan, to hold the mixture under pressure that is higher than atmospheric pressure.

As an apparatus for the dispersion process, any generally known dispersing apparatuses may be used such as a ball-mill, roll-mill, sand-mill, attritor, pearl-mill, dino-mill, high-pressure homogenizer, ultrasonic dispersion apparatus, agitator-mill, glen-mill, and CoBall-mill. Out of these, the high-pressure homogenizer, sand-mill, pearl-mill, and dino-mill are preferably used in terms of dispersion efficiency.

The present invention will now be explained more specifically by referring to examples. The "parts" and "%" used below are all on weight-basis.

FIRST EXAMPLE

Mixture A
  Pigment Red 122 24 parts
    (Produced by Clariant Ltd.: Toner Magenta E02) 10% aqueous solution of POE (n=40) nonylphenyl ether 120 parts
    (Surfactant dispersant)
  Ion-exchanged water 16 parts Firstly, the above mixture A and a Teflon-coated stirring bar ("Teflon" is the trademark for certain polytetrafluoroethylene) were put in a 500 ml beaker. The beaker was then placed in a small-scale desktop vacuum desiccator, which was made of reinforced acrylic resin plate and had a manometer with inside dimension of 260 mm×180 mm×260 mm, and a powerful magnetic stirrer was set underneath the vacuum desiccator. The stirrer was switched on and while the mixture A was being mildly stirred, the pressure inside the desiccator was gradually reduced by a vacuum pump equipped outside until the pressure reached 1330 Pa. After the mixture A was stirred for 10 minutes under the pressure which is less than the atmospheric pressure, formation of bubbles ceased.

Secondly, the pressure inside the vacuum desiccator was gradually brought back to atmospheric pressure. After that, the beaker containing the mixture A was taken out of the vacuum desiccator and stirred under atmospheric pressure for 10 minutes. Dispersion process of the mixture A that had been processed under reduced pressure was subsequently done for 6 hours using a sand-mill (batch desktop sand-mill produced by Kanpe Hapio Co., Ltd.) with zirconia balls of 0.3 mm diameter. As a result, a pigment dispersion liquid A with an average particle size of 121.8 nm was obtained. For measuring the average particle size, MICROTRAC UPA 150 produced by Nikkiso Co., Ltd. was used.

FIRST COMPARATIVE EXAMPLE

A pigment dispersion liquid B was obtained in the same way as in the first example except that the mixture A had not been held under pressure which is less than the atmospheric pressure. Average particle size of the pigment dispersion liquid B was 148.4 nm.

SECOND EXAMPLE

Mixture B
  Pigment Yellow 138 24 parts
    (LIONOGEN YELLOW 1010 produced by Toyo Ink Mfg. Co., Ltd.)
    10 % aqueous solution of POE (n=40) nonylphenyl ether 120 parts
    (Surfactant dispersant)
  Ion-exchanged water 16 parts A pigment dispersion liquid C was obtained in the same manner as that in the first example except that the above mixture B was used instead of the mixture A of the first example. The average particle size of the pigment dispersion liquid C was 89.9 nm.

SECOND COMPARATIVE EXAMPLE

A pigment dispersion liquid D was obtained in the same way as that in the second example except that the mixture B in the second example had not been held under pressure which is less than the atmospheric pressure. Average particle size of the pigment dispersion liquid D was 116.0 nm.

THIRD EXAMPLE

Mixture C
  Pigment Blue 15:3 24 parts
    (LIONOL BLUE FG-7351 produced by Toyo Ink Mfg. Co., Ltd.)
  Ion-exchanged water 71 parts
  Diethylene glycol 5 parts Firstly the above mixture C instead of the mixture A of the first example, was held under pressure which is less than the atmospheric pressure in the same manner as that in the first example, and the following dispersant aqueous solution A was subsequently added to the mixture under atmospheric pressure and the mixture was stirred for 30 minutes.

Dispersant aqueous solution A
  POE (n=12) monostyril phenyl ether 20 parts
  Ion-exchanged water 40 parts Secondly, the above stirred liquid underwent the dispersion process for 3 hours in the same way as that in the first example, and a pigment dispersion liquid E was obtained. Average particle size of the pigment dispersion liquid E was 117.9 nm.

THIRD COMPARATIVE EXAMPLE

A pigment dispersion liquid F was obtained in the same way as that in the third example, except that the mixture C had not been held under pressure which is less than the atmospheric pressure. Average particle size of the pigment dispersion liquid F was 148.9 nm.

As explained above, according to the present invention, a pigment dispersion liquid can be efficiently prepared by holding the mixture under a pressure which is less than the atmospheric pressure followed by a pressure equal to or higher than the atmospheric pressure, and a dispersion process is carried out after that. Otherwise, a mixture consisting of at least a pigment and a liquid medium is held under a pressure which is less than the atmospheric pressure followed by addition of a dispersant to the mixture for a dispersion process while and/or after the mixture is subsequently held under a pressure equal to or higher than the atmospheric pressure. Further, according to the invention, in particular, a pigment dispersion liquid having a micro particle size suitable for ink-jet-recording inks can be produced efficiently in a short period of time.

Moreover, by selecting the specified liquid medium, pigment or dispersant, pigment dispersion liquid with a micro particle size suitable for ink-jet-recording inks can be provided.

The present document incorporates by reference the entire contents of Japanese priority document, 2000-265832 filed in Japan on Sep. 1, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of producing a pigment dispersion liquid comprising pigment, liquid medium, and a dispersant, the method comprising:

holding a mixture comprising the pigment, liquid medium and the dispersant under a pressure which is less than atmospheric pressure and then holding said mixture under a pressure equal to or higher than the atmospheric pressure; and performing a dispersion process.

2. The method of producing a pigment dispersion liquid according to claim 1, wherein said mixture is stirred while being held under the pressure which is less than the atmospheric pressure.

3. The method of producing a pigment dispersion liquid according to claim 1, wherein the pressure which is less than the atmospheric pressure is equal to or lower than 6.65 kPa.

4. The method of producing a pigment dispersion liquid according to claim 1, wherein a time for which said mixture is held under the pressure which is less than the atmospheric pressure is equal to or longer than one minute.

5. The method of producing a pigment dispersion liquid according to claim 1, wherein said mixture is held under the pressure which is less than the atmospheric pressure until formation of bubbles in said mixture stops.

6. The method of producing a pigment dispersion liquid according to claim 1, wherein a time for which said mixture is held under the pressure equal to or higher than the atmospheric pressure is equal to or higher than one minute.

7. The method of producing a pigment dispersion liquid according to claim 1, wherein the dispersion process is performed using a high-pressure homogenizer, a sand-mill, a pearl-mill, or a dino-mill.

8. The method of producing a pigment dispersion liquid according to claim 1, wherein said liquid medium is a water-soluble medium.

9. The method of producing a pigment dispersion liquid according to claim 1, wherein said pigment is an organic pigment.

10. The method of producing a pigment dispersion liquid according to claim 1, wherein said dispersant is a surfactant.

11. The method of producing a pigment dispersion liquid according to claim 1, wherein said mixture comprises carbon black.

12. The method of producing a pigment dispersion liquid according to claim 1, wherein said mixture comprises Pigment Red 122.

13. The method of producing a pigment dispersion liquid according to claim 1, wherein said mixture comprises Pigment Blue 15:3.

14. The method of producing a pigment dispersion liquid according to claim 1, wherein said mixture comprises Pigment Yellow 138.

15. The method of producing a pigment dispersion liquid according to claim 1, wherein average particle size of said pigment in said pigment dispersion liquid is 200 nm or smaller.

16. A method of producing a pigment dispersion liquid comprising pigment, liquid medium, and a dispersant, the method comprising:

holding a mixture comprising the pigment and the liquid medium under a pressure which is less than atmospheric pressure and then holding said mixture under a pressure equal to or higher than the atmospheric pressure; and adding a dispersant to said mixture while, after or both while and after said mixture is held under the pressure equal to or higher than the atmospheric pressure; and performing a dispersion process.

17. The method of producing a pigment dispersion liquid according to claim 16, wherein said mixture is stirred while being held under the pressure which is less than the atmospheric pressure.

18. The method of producing a pigment dispersion liquid according to claim 16, wherein the pressure which is less than the atmospheric pressure is equal to or lower than 6.65 kPa.

19. The method of producing a pigment dispersion liquid according to claim 16, wherein a time for which said mixture is held under the pressure which is less than the atmospheric pressure is equal to or longer than one minute.

20. The method of producing a pigment dispersion liquid according to claim 16, wherein said mixture is held under the pressure which is less than the atmospheric pressure until formation of bubbles in said mixture stops.

21. The method of producing a pigment dispersion liquid according to claim 16, wherein a time for which said mixture is held under the pressure equal to or higher than the atmospheric pressure is equal to or higher than one minute.

22. The method of producing a pigment dispersion liquid according to claim 16, wherein the dispersion process is performed using a high-pressure homogenizer, a sand-mill, a pearl-mill, or a dino-mill.

23. The method of producing a pigment dispersion liquid according to claim 16, wherein said liquid medium is a water-soluble medium.

24. The method of producing a pigment dispersion liquid according to claim 16, wherein said pigment is an organic pigment.

25. The method of producing a pigment dispersion liquid according to claim 16, wherein said dispersant is a surfactant.

26. The method of producing a pigment dispersion liquid according to claim 16, wherein said mixture comprises carbon black.

27. The method of producing a pigment dispersion liquid according to claim 16, wherein said mixture comprises Pigment Red 122.

28. The method of producing a pigment dispersion liquid according to claim 16, wherein said mixture comprises Pigment Blue 15:3.

29. The method of producing a pigment dispersion liquid according to claim 16, wherein said mixture comprises Pigment Yellow 138.

30. The method of producing a pigment dispersion liquid according to claim 16, wherein an average particle size of said pigment in said pigment dispersion liquid is 200 nm or smaller.

* * * * *